United States Patent
Walke, III et al.

(10) Patent No.: US 11,087,034 B1
(45) Date of Patent: Aug. 10, 2021

(54) LARGE-SCALE CAPITAL PROJECT CABLE ROUTING SIMULATOR

(71) Applicant: Hexagon Technology Center GmbH, Heerbrugg (CH)

(72) Inventors: Luther E. Walke, III, Huntsville, AL (US); Satish Subramanya Hota, Skillman, NJ (US); Kishore Kumar Reddy Koduru, Madison, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 424 days.

(21) Appl. No.: 16/005,133

(22) Filed: Jun. 11, 2018

Related U.S. Application Data

(60) Provisional application No. 62/518,083, filed on Jun. 12, 2017.

(51) Int. Cl.
| | |
|---|---|
| *G06F 30/392* | (2020.01) |
| *G06F 30/394* | (2020.01) |
| *G06F 30/398* | (2020.01) |
| *G06F 30/367* | (2020.01) |
| *G06F 30/36* | (2020.01) |
| *G06F 30/13* | (2020.01) |
| *G06F 113/16* | (2020.01) |

(52) U.S. Cl.
CPC .............. *G06F 30/13* (2020.01); *G06F 30/36* (2020.01); *G06F 30/367* (2020.01); *G06F 30/392* (2020.01); *G06F 30/394* (2020.01); *G06F 30/398* (2020.01); *G06F 2113/16* (2020.01)

(58) Field of Classification Search
CPC ...... G06F 30/13; G06F 30/392; G06F 30/367; G06F 30/398; G06F 30/394; G06F 30/36; G06F 2113/16
See application file for complete search history.

(56) References Cited

U.S. PATENT DOCUMENTS

2007/0038415 A1 * 2/2007 Okada et al. ........... G06F 17/50
703/1

OTHER PUBLICATIONS

SPC for Excel, "Explaining Standard Deviation", https://www.spcforexcel.com/knowledge/basic-statistics/explaining-standard-deviation, BPI Consulting (Year: 2005).*

(Continued)

*Primary Examiner* — Rehana Perveen
*Assistant Examiner* — Nupur Debnath
(74) *Attorney, Agent, or Firm* — Nutter McClennen & Fish LLP

(57) ABSTRACT

A large-scale capital project simulator has a project modeler configured to model the project as a virtual model having cable trays directing cables across the large-scale capital project. The simulator also has a cable router to lay out cables across the virtual model of the large-scale capital project. Each cable has a laid-out cable length. The simulator also has a routing manager to determine optimized routes of the cables across the virtual model. In this case, each cable has an optimized cable length along at least one of the optimized routes. The routing manager formulates an effectiveness ratio for each cable, where each effectiveness ratio uses the laid-out cable length and the optimized cable length. A filter determines whether any of the effectiveness ratios exceeds a prescribed deviation amount. A model controller transforms the virtual model to identify cable(s) exceeding the prescribed deviation amount.

23 Claims, 5 Drawing Sheets

(56) References Cited

OTHER PUBLICATIONS

Dr. Peterson, "The Math Forum", http://mathforum.org/library/drmath/view/62835.html#search (Year: 2003).*

* cited by examiner

| Cable ID | Optimal Length | Actual Length | Effectiveness Ratio |
|---|---|---|---|
| X1234 | 25 | 27 | 1.08 |
| X8493 | 160 | 210 | 1.31 |
| Y89742 | 33 | 36 | 1.09 |
| X7840 | 10 | 90 | 9.00 |
| Z89483 | 223 | 240 | 1.08 |

Fig. 2

LARGE-SCALE CAPITAL PROJECT CABLE ROUTING SIMULATOR

PRIORITY

This patent application claims priority from provisional U.S. patent application No. 62/518,083, filed Jun. 12, 2018 entitled, "3D CABLE ROUTING MANAGER," and naming Luther E. Walke III as inventor, the disclosure of which is incorporated herein, in its entirety, by reference.

FIELD OF THE INVENTION

The invention generally relates to routing cable and, more particularly, the invention relates to effectively and efficiently routing cable within a large-scale capital project

BACKGROUND OF THE INVENTION

Design, construction, and management of large-scale capital projects, such as process plants (e.g., oil refineries and pharmaceutical plants), power plants (e.g., a coal fueled power generation facility), ships (e.g., military shipping, cruise ships, or cargo ships), and off-shore oil platforms, requires coordination of processes and configuration data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive plant design programs (e.g., SmartPlant® Enterprise, distributed by Intergraph, Inc. of Huntsville, Ala.) that are specially configured for the rigors of such large capital projects. Among other things, this type of plant design program can be implemented as a broad application suite that manages most or all phases of a large-scale capital project, from initial conception, to design, construction, handover, maintenance, management, and decommissioning.

Large capital projects consume and/or produce significant amounts of electricity and rely heavily on data communications. As such, transmission cables (e.g., power and signal) are a significant cost driver on a large-scale capital project. Copper can be quite expensive and thus, inefficient cable deployment undesirably can substantially drive up the cost of such a project.

SUMMARY OF VARIOUS EMBODIMENTS

In accordance with one embodiment of the invention, a large-scale capital project simulator has a project modeler configured to model the large-scale capital project as a virtual model. The virtual model includes a plurality of cable trays for directing cables across at least a portion of the large-scale capital project. The simulator also has a cable router operatively coupled with the project modeler. The cable router is configured to lay out a plurality of cables across the virtual model of the large-scale capital project, and at least one of the plurality of cables is laid out in the virtual model using at least one the plurality of cable trays. Each cable has a laid-out cable length, and each cable is laid out using at least one of the cable trays.

The simulator has a plurality of additional components. Specifically, it has a routing manager operatively coupled with the cable router. The routing manager is configured to determine optimized routes of the plurality of cables across the virtual model of the large-scale capital project. In this case, each cable has an optimized cable length along at least one of the optimized routes. The routing manager also is configured to formulate an effectiveness ratio for each of the plurality of cables, where each effectiveness ratio uses both the laid-out cable length and the optimized cable length. A second of the additional simulator components includes a filter operatively coupled with the routing manager. The filter is configured with a deviation amount and to calculate the effectiveness ratios of the plurality of cables to determine whether any of the effectiveness ratios exceeds a prescribed deviation amount.

The simulator also has a model controller operatively coupled with the filter. The model controller is configured to transform the virtual model with prescribed graphical indicia to identify cable(s) that exceed the prescribed deviation amount.

Illustrative embodiments also include a method that performs the functions noted above.

In some embodiments, the model controller is configured to transform, in response to re-routing input information, the virtual model to re-route cable(s) that exceed the prescribed deviation amount. Moreover, at least a portion of the optimized cable length may not use the cable trays. Among other things, optimized cable length may include a plurality of segments across the large-scale capital project, where each of the plurality of segments is either longitudinal or latitudinal with respect to the large-scale capital project.

To provide a more comprehensive view of the large-scale capital project, the model controller may be configured to generate indicia indicating the effectiveness ratio for each of the cables in the plurality of cables. In addition or alternatively, the model controller may be configured to display a first plurality of cables using a first format and a second plurality of cables using a second, different format. In this example, the first plurality of cables may be within the prescribed deviation amount, while the second plurality of cables may exceed the prescribed deviation amount.

Those skilled in the art may select an effectiveness ratio that satisfies specific requirements. For example, the effectiveness ratio may include the ratio of the laid-out cable length to the optimized cable length. To use that or another effectiveness ratio, the routing manager may be configured to determine 1) the mean effectiveness ratio for the plurality of cables, and 2) the standard deviation from the mean effectiveness ratio. In this example, the prescribed deviation amount may be the standard deviation.

The filter may be configured to compare the effectiveness ratios against the prescribed deviation amount, and identify a set of zero or more cables having effectiveness ratios that exceed the prescribed deviation amount. Moreover, to provide a user with additional information, the model controller may be configured to 1) produce a table of cables indicating the effectiveness ratio for each of the cables in the table, 2) display identification information of cable(s) in the table with effectiveness ratio(s) exceeding the prescribed deviation amount, if any, using a first format, and 3) display identification information of cable(s) in the table with effectiveness ratio(s) not exceeding the prescribed deviation amount, if any, using a second format different from the first format.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2 schematically shows a table of cables and their effectiveness ratios in accordance with illustrative embodiments of the invention.

DESCRIPTION OF ILLUSTRATIVE EMBODIMENTS

Illustrative embodiments enable a designer to more efficiently route cable across a large-scale capital project, consequently saving significant time and cost. To that end, a simulator having a cable routing manager lays out cables within a virtual model simulating the large-scale capital project. The cable routing manager then formulates an effectiveness ratio that is a function of both the actual lengths of the cables as laid out (in the virtual model), and optimized cable lengths. The routing manager modifies the virtual model to identify cables having an effectiveness ratio that exceeds some prescribed deviation amount from a mean effectiveness ratio of a set of cables in the model. Accordingly, a user can more easily locate outlier cables, and make appropriate changes to the virtual model to more efficiently lay out the cables. Details of illustrative embodiments are discussed below.

Figure 1:
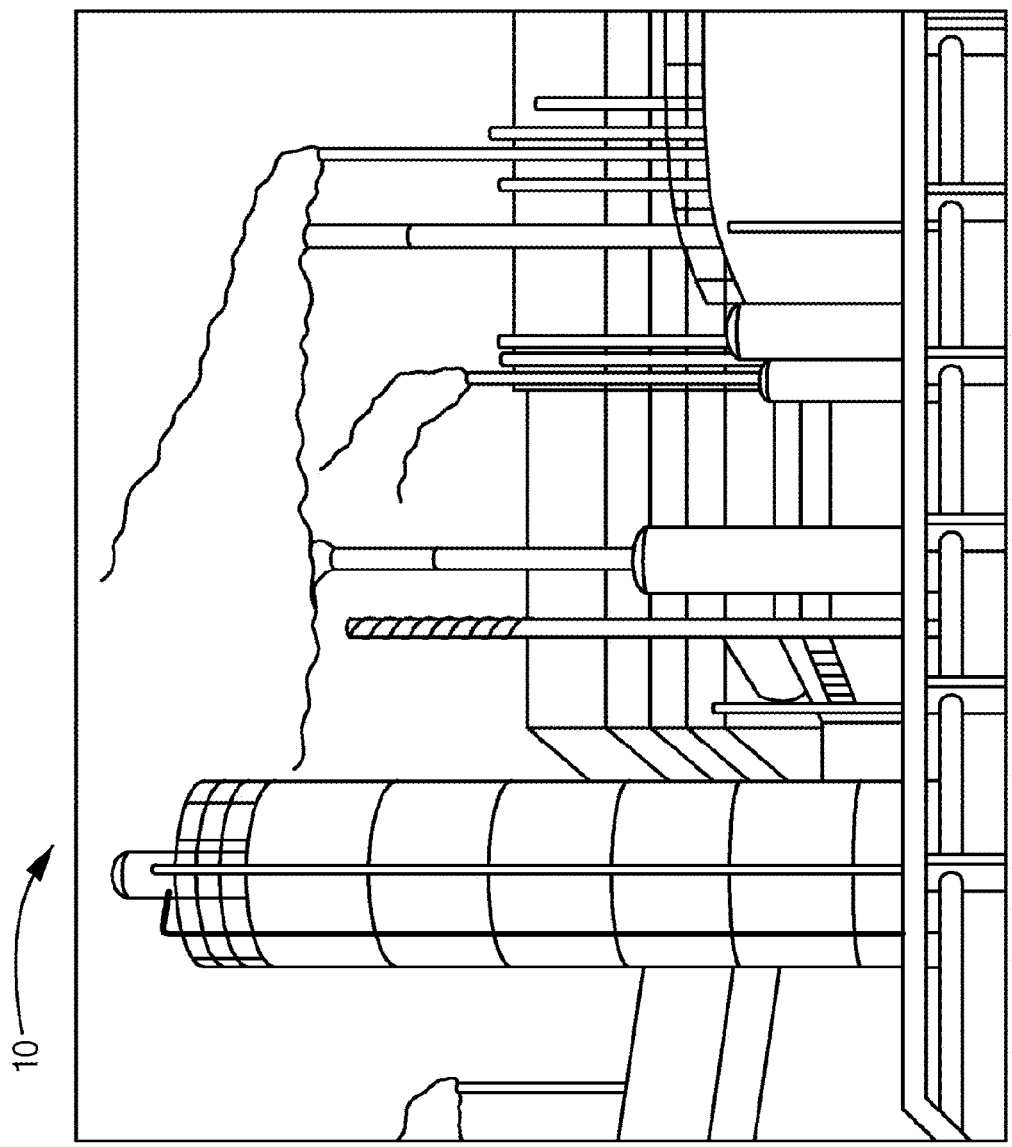
FIG. 1 shows a large-scale capital project that may use illustrative embodiments of the invention.

As noted, illustrative embodiments preferably or use to design large-scale capital projects. FIG. 1 generally shows one example of a large-scale capital project 10 (or more generally a "capital project 10") that may implement illustrative embodiments of the invention. More specifically, as known by those skilled in the art, a capital project 10 generally is a long-term investment made to build, augment, add, or improve on a highly capital intensive project—it requires notable amounts of both financial capital and labor capital to undertake, and often takes years to complete. Capital projects 10 are often defined by their large-scale cost relative to other investments requiring less planning and resources (e.g., building a house or a truck). Both the private sector and public sector can be involved in a capital project 10. Some examples of capital projects includes developing and maintaining roads, railways, power plants, ships, offshore oil platforms, dams, large aircraft, and factories.

The capital project 10 shown in FIG. 1 is a power plant, which, as known by those skilled in the art, has an enormous number of different components that cooperate to accomplish its function of generating power. For example, among other things, the power plant of this figure has a plurality of large and small buildings, smokestacks, pipes, valves, fuel tanks, ladders, and electrical systems. Indeed, designing, building, and maintaining such a project requires vast amounts of planning and coordination. Without careful planning and coordination, the power plant may never have been built or operated.

To that end, those skilled in the art have developed 3D design programs/products ("3D design programs," also known as "plant design programs") to assist in planning/designing, developing, maintaining, and decommissioning capital projects 10, such as that shown in FIG. 1. As noted above, one such widely used 3D design program is known as the SmartPlant® Enterprise product (hereinafter "SmartPlant® product"), distributed by Intergraph, Inc. of Huntsville, Ala. In a manner similar to other such products, the SmartPlant® product has at least the following interrelated functions and components:

3D modeling and visualization,
engineering and schematics,
information management,
procurement, fabrication, and construction,
open integration with other proprietary and open systems.

Accordingly, among other people, designers, engineers, developers, and managers use these and other features of 3D design programs, such as the SmartPlant® product, to design, update, manage, and decommission capital projects 10, such as the power plant shown in FIG. 1. To that end, 3D design programs are useful in generating virtual models (i.e., computerized models) of the capital project. During use, a 3D design program generates many detailed 3D representations of components in the capital project 10. Some of those virtual models may include all of the components of the currently design project, or just certain systems.

For example, a 3D design program may generate detailed 3D renderings of the cable systems, and enough other structure to detail the cable systems within the power plant of FIG. 1. To accomplish some function, a user may manipulate or modify the 3D renderings of specific components of the cable system, such as specific cables and cable trays. For example, a user may render a 3D representation of a given cable tray on a display device, rotate it to determine or confirm certain properties, and modify certain of its attributes.

As known by those skilled in the art, cables within a capital project often transmit a wide variety of electrical signals between various selected points. For example, cables can transmit high-voltage signals, low-voltage signals, control signals, fiber-optic signals, etc. Those cables can be made from a wide variety of materials, including copper, glass, and other widely used and expensive materials. A single capital project can have hundreds of thousands of different cables. Consequently, the cost of cable and cable routing can be quite expensive and preferably is carefully managed to reduce overall cost. Inefficient cable routing therefore can have a substantially bloating impact on the cost of an overall project, leading to budget overrides, logistical problems on the construction site, and other problems.

The inventor recognized that identifying inefficiently routed cables while developing the virtual model (e.g., during construction) could have a significant impact on the efficiency and cost of the cable routing process. Often, the location of cables can be obscured by walls, floors or other structures. Given the massive number of cables in a typical capital project, however, both determining and locating inefficiently routed cables presents a substantial technical challenge. Moreover, efficiently laying out cables during construction can be technically problematic due to the complexity of the design of the project. To obviate this problem, the inventor developed modeling/simulation technology that uses a measure of the effectiveness or efficiency of the length of a cable within the capital project.

Specifically, after laying out a cable in the virtual model, a cable routing manager, which preferably is part of a simulator (discussed below) of a plant design program (i.e., a 3D design program), calculates a value representing the efficiency of the route of the cable across the capital project. In preferred embodiments, that value is a comparison of the actual length of the cable in the virtual model and an optimal length of the cable within the virtual model.

The optimal length can be determined based upon any of a wide variety of factors. For example, the optimal length can simply be the distance between two points in the three-dimensional space of the capital project. As another example, the optimal length can be the distance between two points, but along a path with one or more segments/sections that are longitudinally and/or latitudinally across the virtual model of the capital project in three-dimensional model space. As such, if the path between the two points has more than one segment/section, each segment/section will be parallel to one axis of a three-dimensional Cartesian coordinate axis within the virtual model (e.g., the three-dimensional Cartesian coordinate axis of the virtual model itself). In illustrative embodiments, the optimal length is calculated without regard to the positions of the cable tray(s) within the virtual model.

Some embodiments calculate the effectiveness ratio simply as a ratio of the actual length divided by the optimal length. FIG. 2 schematically shows a table identifying five specific cables in a capital project. As shown, the table shows the optimal length of each cable, the actual length of the cable, and the effectiveness ratio. As discussed in greater detail below regard to FIG. 5, some embodiments highlight cables, in the virtual model and/or in the table, having an effectiveness ratio that exceeds some prescribed limit. FIG. 2, for example, highlights cable X7830 because its effectiveness ratio is significantly larger than the other four effectiveness ratios.

Indeed, the effectiveness ratio can take other forms. For example, the effectiveness ratio can be the optimal length divided by the actual length. Other embodiments may add scaler amounts to scale the ratios. Yet other embodiments may calculate the effectiveness ratio by simply subtracting the actual length from the optimal length, or the optimal length from the actual length. Those skilled in the act can formulate the effectiveness ratio using additional variables and formulas depending upon the circumstance for their application.

Figure 3:
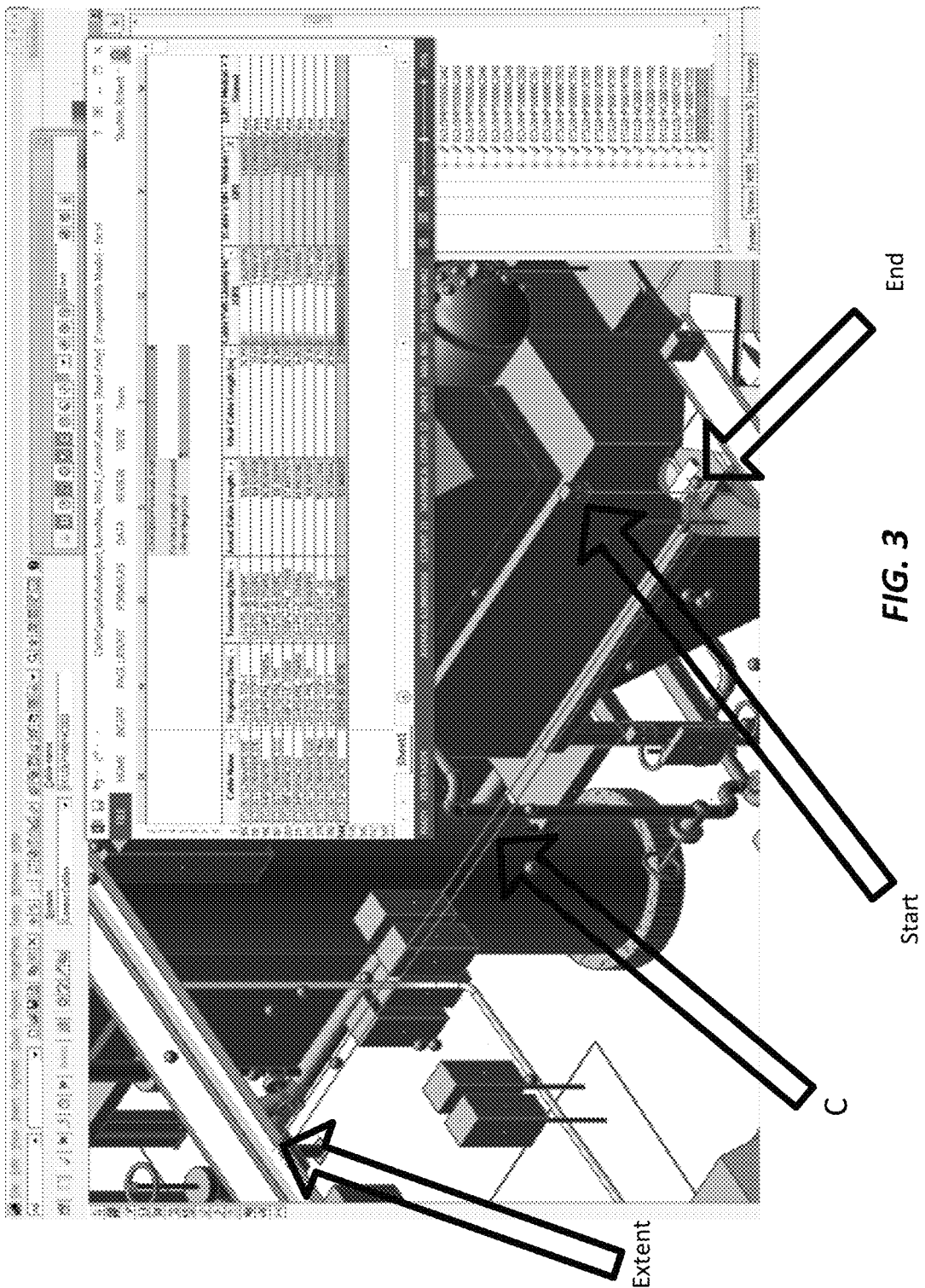
FIG. 3 schematically shows a portion of a capital project virtual model, and an inefficient lay out of a specific cable within that model.

FIG. 3 schematically shows a portion of a capital project virtual model, and an inefficient layout of a certain cable C within that model. That layout could be a long-standing layout of the plant years after construction, or an initial layout during construction. Specifically, as shown, the cable C is intended to be laid out between two points on the right side of the figure. The two points are identified in the figures as "Start" and "End." Rather than simply making a direct connection upwardly/downwardly from the perspective of the drawing, the cable C instead is laid out extending all the way across the room and back (see "Extent" in FIG. 3 showing the maximum extent of this cable C). This inefficient lay out may be a good example of cable X7830 of FIG. 2. To more easily locate this cable C within the virtual model, a simulation tool (noted below) may highlight or otherwise modify cable X7830 in the virtual model (e.g., identify it with unique features or indicia), contrasting it with other cables. The designer then may use the simulation tool (discussed below) to make appropriate changes to the virtual model to more efficiently lay out cable C between the two desired points.

The virtual model also may include additional indicia representing information relating to further parameters/characteristics of the cable C. Among other things, that indicia may include a table on the display of the virtual model itself, as shown, showing the cable name, originating device, terminating device, actual cable length, ideal cable length, cable path quality, and the noted effectiveness ratio of the cable C. The table could be more simplified, such as that shown in FIG. 2. The table can be color coded or have other distinguishing indicia to highlight or select certain cables in the virtual model.

Figure 4:
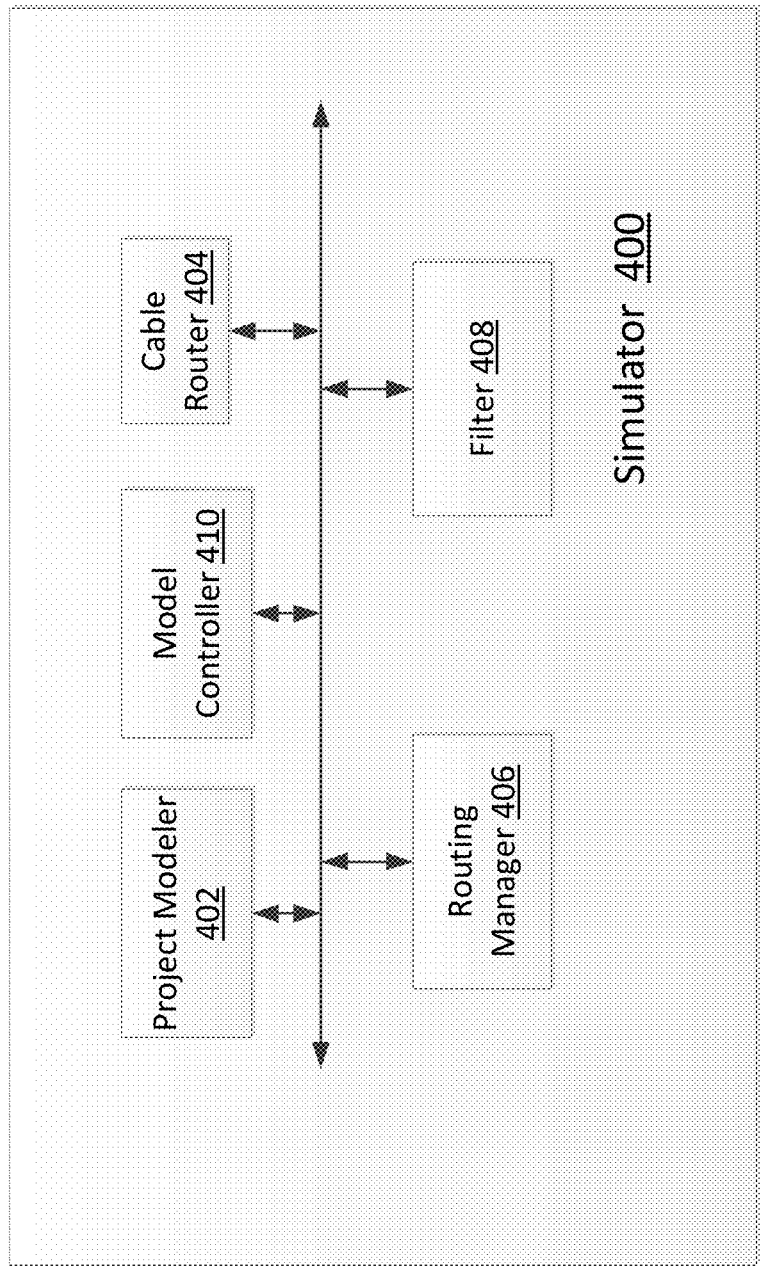
FIG. 4 schematically shows a large-scale capital project simulator configured in accordance with illustrative embodiments of the invention.

FIG. 4 schematically shows a large-scale capital project simulator 400 configured in accordance with illustrative embodiments. Each of the components of the simulator 400 is operatively connected by any conventional interconnect mechanism. FIG. 4 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 4 only schematically shows each of these components. Those skilled in the art should understand that each of these components can be implemented in a variety of conventional manners, such as by using hardware, software, or a combination of hardware and software, across one or more other functional components. For example, the project modeler 402 (discussed below) may be implemented using a plurality of microprocessors executing firmware. As another example, the project modeler 402 may be implemented using one or more application specific integrated circuits (i.e., "ASICs") and related software, or a combination of ASICs, discrete electronic components (e.g., transistors), and microprocessors. Accordingly, the representation of the project modeler 402 and other components in a single box of FIG. 4 is for simplicity purposes only. In fact, in some embodiments, the project modeler 402 of FIG. 4 is distributed across a plurality of different machines—not necessarily within the same housing or chassis.

It should be reiterated that the representation of FIG. 4 is a significantly simplified representation of an actual simulator Those skilled in the art should understand that such a device has many other physical and functional components, such as central processing units, processing modules, and memory. Accordingly, this discussion is in no way intended to suggest that FIG. 4 represents all of the elements of the large-scale capital project simulator 400.

As shown, the simulator 400 has a project modeler 402 configured to model the large-scale capital project as a virtual model, a cable router 404 configured to lay out a plurality of cables across the virtual model of the large scale capital project, and a cable routing manager 406 configured to determine optimized routes of the plurality of cables across the virtual model of the large scale capital project. The routing manager 406 also is configured to formulate an effectiveness ratio for each of the plurality of cables, where each effectiveness ratio uses the laid-out cable length and an optimized cable length (discussed below).

The simulator 400 also has a filter 408 configured to calculate the effectiveness ratios of the plurality of cables to determine whether any of the effectiveness ratios exceeds some prescribed deviation amount, and a model controller 410 configured to transform the virtual model with prescribed graphical indicia/formatting to identify cable(s) that exceed the prescribed deviation amount.

Figure 5:
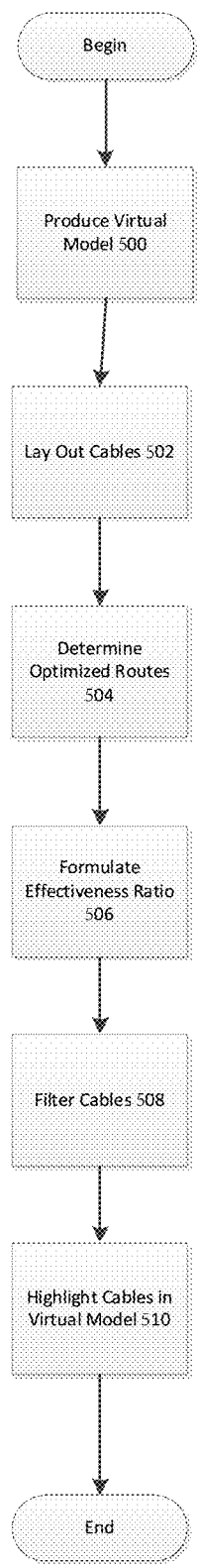
FIG. 5 shows a modeling/simulation process of designing the cable lay out within a virtual model of a capital project in accordance with illustrative embodiments of the invention.

FIG. 5 shows a process of using a modeling program/simulation configured to design the cable lay out within a virtual model of a capital project in accordance with illustrative embodiments of the invention. It should be noted that this process may be considered to be simplified from a longer process that normally would be used to design the cable lay out within a capital project. Accordingly, the process may have many other steps that those skilled in the art likely would use. In addition, some of the steps may be performed in a different order than that shown, or at the same time. Those skilled in the art therefore can modify the process as appropriate.

The process begins at step 500, in which a designer or other user, preferably using the simulator 400 of a 3-D plant design program, causes the project modeler 402 to produce at least a portion of a virtual model of the capital project. Indeed, this virtual model (e.g., a CAD model) need not be a complete virtual model of the capital project. In fact, it could only include the bare minimum number of components required to lay out the cables. For example, the virtual model could include simply a small region of a large power plant, such as that portion shown in FIG. 3. Other embodiments may include many necessary and even unnecessary features for determining how to lay out the cables. For example, the virtual model could include potential obstacles for the path of the cables, such as transformers, gas tanks, stairways, rails, plumbing, walls, and girders.

To effectively lay out the cables, the virtual model also includes one or more cable trays. Specifically, as known by those skilled in the art, a cable tray supports and directs the routing of electric cables used for power distribution and communication across a building or capital project. As also known by those skilled in the art, cable trays used in large-scale capital projects can include hundreds or even thousands of different, unrelated cables, and each tray typically can hold up to a maximum number of cables. Accordingly, prudent use and placement of cable trays is important when routing cables across the capital project. For example, improperly placed cable trays can lead to unnecessarily long cable requirements. As another example, the designer often aims to prudently use the cable tray in view of its maximum cable limit. If that limit is reached, then subsequently laid out cables may need to take a circuitous, inefficient path across the capital project.

The process continues to step 502, in which the simulator 400 transforms the virtual model of the large-scale capital project. To that end, the cable router 404 lays out cables in the virtual model. Specifically, using the cable router 404, logic or a user lays out cables between various points across the virtual model of the capital project. As known by those skilled in the art, some or all of the paths of cables follows some of the previously positioned cable trays in the virtual model. At this point in the process, the cable routing manager 406 knows the actual length of each of the cables laid out in the virtual model.

Next, the cable routing manager 406 determines the optimized routes or paths for the cables (step 504). As noted above, the cable routing manager 406 may determine these optimized routes using any of a variety of techniques, such as by using paths having one or more segments parallel to one of three axes in a three-dimensional Cartesian coordinate system, such as that of the capital project itself.

The cable routing manager 406 then can calculate the effectiveness ratio (step 506) and optionally display those effectiveness ratios in a table, such as that shown in FIG. 2.

After or while calculating the effectiveness ratios, the cable routing manager 406 may use the filter 408 to determine the cables, if any, that exceed some prescribed quality or effectiveness factor (step 508).

In illustrative embodiments, the cable routing manager 406 may control the filter 408 by calculating the average or mean effectiveness ratio of some set of cables in the virtual model. That set of cables may include all of the cables, or some smaller set of the cables. After calculating the mean effectiveness ratio, the cable routing manager 406 may calculate some prescribed "deviation amount," thus defining a range of cable lengths that are reasonable for the given application. One skilled in the art may select this deviation amount depending upon a number of factors required by the application.

For example, the deviation amount may be the standard deviation, or a multiple of the standard deviation, from the mean effectiveness ratio of all of the cables in the set of cables. As such, all cables having an effectiveness ratio that is within the standard deviation of the mean effectiveness ratio of the cables may be filtered in a manner so that they are considered to be satisfactory. In contrast, all cables having an effectiveness ratio that is outside of the standard deviation of the mean effectiveness ratio may be considered to be unsatisfactory.

To illustrate this point, consider a filtered set of cables having a mean effectiveness ratio of 1.20 and a standard deviation of 0.1. A given cable in a set having an effectiveness ratio of 1.25 will be considered satisfactory, while a second cable in that set having an effectiveness ratio of 1.35 will be considered unsatisfactory. Preferred embodiments do not take the lower limit into account because a lower effectiveness ratio provides improved results. For example, a cable having an effectiveness ratio of 1.01 would be considered excellent in this example and thus, not filtered into the unsatisfactory group. Accordingly, only those cables exceeding the upper limit of the standard deviation may be considered unsatisfactory.

Indeed, as noted above, those skilled in the art can use any of a wide variety of techniques and calculations to calculate the effectiveness ratio and the prescribed deviation amount. Accordingly, discussion of the standard deviation is for illustrative purposes and not intended to limit various embodiments in the invention.

Those skilled in the art may filter using techniques other than the standard deviation from the mean effectiveness ratio. For example, the designer may compare the effectiveness ratios of cables from other similar, completed projects against the current project.

Accordingly, the cable routing manager 406 uses the filter 408 to filter the cables into satisfactory and unsatisfactory groups. Next, the process concludes at step 510 in which the model controller 410 transforms the virtual model by highlighting cables in the virtual model in one of the two sets of cables. Specifically, the cable routing manager 406 may control the filter 408 and model controller 410 to identify the cables in the 2 different groups using different visual indicia. For example, the cables in the virtual model that are within the unsatisfactory group may be displayed using a first color (e.g., red), while the cables and the satisfactory group may be displayed in a second color (e.g., green). Also, as shown in FIG. 2, the cables in one of the two groups may be highlighted within the table of cables. Other indicia may use text and an arrow to differentiate the two groups, hatching, line shading, etc.

Some embodiments automatically distinguish the two groups of cables using prescribed visual indicia, such as different colors. Other embodiments, however, may not automatically provide that distinction. Instead, some of those embodiments may enable a user or designer to select a cable to be highlighted in the virtual model. For example, using the table of FIG. 2, the user may select cables X1234 and X7830. In response, the virtual model may display both cables, but in different colors to distinguish them as being satisfactory and unsatisfactory.

Rather than using just two groups, the cable routing manager 406 may have three or more groups to show various gradations of effectiveness ratios. Each of the different groups may have different or similar visual indicia depending upon the application, and the cable routing manager 406 may use the filter and model controller 410 in the above noted manner.

Accordingly, a designer or other user may more easily locate cables that are unsatisfactory and modify the virtual model to more effectively lay out those cables. For example, using the model controller 410, the designer may transform the virtual model to:

1) add a cable tray to a certain area that previously did not have a cable tray, 2) move the location of a cable tray to more efficiently route the necessary cable(s), or 3) enlarge an existing tray that the cable(s) could have otherwise used were it not already filled to its limit.

The designer make again repeat the process of FIG. 5 to iteratively improve the cable layout within the virtual model, ultimately and more effectively saving significant costs in the project.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A large-scale capital project computer-implemented simulator comprising:
   a computer hardware, or a combination of computer hardware and software, configured to implement:
   a project modeler configured to model the large-scale capital project as a virtual model, the virtual model including a plurality of cable trays for directing cables across at least a portion of the large-scale capital project;
   a cable router operatively coupled with the project modeler, the cable router configured to lay out a plurality of cables across the virtual model of the large-scale capital project, at least one of the plurality of cables being laid out in the virtual model using at least one the plurality of cable trays, each cable having a laid-out cable length, each cable being laid out using at least one of the cable trays;
   a routing manager operatively coupled with the cable router, the routing manager configured to determine optimized routes of the plurality of cables across the virtual model of the large-scale capital project, each cable having an optimized cable length along at least one of the optimized routes,
   the routing manager also configured to formulate an effectiveness ratio for each of the plurality of cables, each effectiveness ratio using the laid-out cable length and the optimized cable length;
   a filter operatively coupled with the routing manager and configured with a deviation amount, the filter also being configured
   to calculate the effectiveness ratios of the plurality of cables to determine whether any of the effectiveness ratios exceeds a prescribed deviation amount,
   to compare the effectiveness ratios against the prescribed deviation amount, and
   to identify a set of zero or more cables having effectiveness ratios that exceed the prescribed deviation amount; and
   a model controller operatively coupled with the filter, the model controller being configured to transform the virtual model with prescribed graphical indicia to identify cable(s) that exceed the prescribed deviation amount.

2. The simulator as defined by claim 1 further wherein the model controller is configured to transform, in response to re-routing input information, the virtual model to re-route cable(s) that exceed the prescribed deviation amount.

3. The simulator as defined by claim 1 wherein at least a portion of the optimized cable length does not use the cable trays.

4. The simulator as defined by claim 1 wherein the optimized cable length includes a plurality of segments across the large-scale capital project, each of the plurality of segments being either longitudinal or latitudinal with respect to the large-scale capital project.

5. The simulator as defined by claim 1 wherein the model controller is configured to generate indicia indicating the effectiveness ratio for each of the cables in the plurality of cables.

6. The simulator as defined by claim 1 wherein the model controller is configured to display a first plurality of cables using a first format and a second plurality of cables using a second format, the first and second formats being different, the first plurality of cables being within the prescribed deviation amount, the second plurality of cables exceeding the prescribed deviation amount.

7. The simulator as defined by claim 1 wherein the effectiveness ratio comprises the ratio of the laid-out cable length to the optimized cable length.

8. The simulator as defined by claim 1 wherein the routing manager is configured to:
determine the mean effectiveness ratio for the plurality of cables; and
determine the standard deviation from the mean effectiveness ratio,
the prescribed deviation amount being the standard deviation.

9. The simulator as defined by claim 1 wherein the model controller is configured to:
produce a table of cables indicating the effectiveness ratio for each of the cables in the table;
display identification information of cable(s) in the table with effectiveness ratio(s) exceeding the prescribed deviation amount, if any, using a first format;
display identification information of cable(s) in the table with effectiveness ratio(s) not exceeding the prescribed deviation amount, if any, using a second format, the first format different from the second format.

10. A computer-implemented method of simulating a large-scale capital project for routing cable, the method comprising:
providing a computer hardware, or a combination of computer hardware and software, configured to implement:
modeling the large-scale capital project as a virtual model, the virtual model including a plurality of cable trays for directing cables across at least a portion of the large-scale capital project;
laying out a plurality of cables across the virtual model of the large-scale capital project, at least one of the plurality of cables being laid out in the virtual model using at least one the plurality of cable trays, each cable having a laid-out cable length, each cable being laid out using at least one of the cable trays;
determining optimized routes of the plurality of cables across the virtual model of the large-scale capital project, each cable having an optimized cable length along at least one of the optimized routes;
formulating an effectiveness ratio for each of the plurality of cables, each effectiveness ratio using the laid-out cable length and the optimized cable length;
receiving a prescribed deviation amount;
filtering, using a filter configured with the prescribed deviation amount, the effectiveness ratios of the plurality of cables to determine whether any of the effectiveness ratios exceeds the prescribed deviation amount,
to compare the effectiveness ratios against the prescribed deviation amount, and to identify a set of zero or more cables having effectiveness ratios that exceed the prescribed deviation amount; and
modifying the virtual model with prescribed graphical indicia to identify cable(s) that exceed the prescribed deviation amount.

11. The method as defined by claim 10 further comprising transforming the virtual model to re-route cable(s) that exceed the prescribed deviation amount.

12. The method as defined by claim 10 wherein at least a portion of the optimized cable length does not use the cable trays.

13. The method as defined by claim 10 wherein the optimized cable length includes a plurality of segments across the large-scale capital project, each of the plurality of segments being either longitudinal or latitudinal with respect to the large-scale capital project.

14. The method as defined by claim 10 further comprising generating indicia indicating the effectiveness ratio for each of the cables in the plurality of cables.

15. The method as defined by claim 10 wherein modifying comprises displaying a first plurality of cables using a first format and displaying a second plurality of cables using a second format,
the first and second formats being different,
the first plurality of cables being within the prescribed deviation amount, the second plurality of cables exceeding the prescribed deviation amount.

16. The method as defined by claim 10 wherein the effectiveness ratio comprises the ratio of the laid-out cable length to the optimized cable length.

17. The method as defined by claim 10 further comprising:
determining the mean effectiveness ratio for the plurality of cables; and
determining the standard deviation from the mean effectiveness ratio, the prescribed deviation amount being the standard deviation.

18. The method as defined by claim 10 further comprising:
producing a table of cables indicating the effectiveness ratio for each of the cables in the table;
displaying identification information of cable(s) in the table with effectiveness ratio(s) exceeding the prescribed deviation amount, if any, using a first format;
displaying identification information of cable(s) in the table with effectiveness ratio(s) not exceeding the prescribed deviation amount, if any, using a second format, the first format different from the second format.

19. A computer program product for use on a computer system for simulating a large-scale capital project for routing cable, the computer program product comprising a tangible, non-transient computer usable medium having computer readable program code thereon, the computer program product comprising:
program code for modeling the large-scale capital project as a virtual model, the virtual model including a plurality of cable trays for directing cables across at least a portion of the large-scale capital project;
program code for laying out a plurality of cables across the virtual model of the large-scale capital project, at least one of the plurality of cables being laid out in the virtual model using at least one the plurality of cable trays, each cable having a laid-out cable length, each cable being laid out using at least one of the cable trays;
program code for determining optimized routes of the plurality of cables across the virtual model of the large-scale capital project, each cable having an optimized cable length along at least one of the optimized routes;

program code for formulating an effectiveness ratio for each of the plurality of cables, each effectiveness ratio using the laid-out cable length and the optimized cable length;

program code for filtering, using a filter configured with a prescribed deviation amount, the effectiveness ratios of the plurality of cables to determine whether any of the effectiveness ratios exceeds the prescribed deviation amount, to compare the effectiveness ratios against the prescribed deviation amount, and to identify a set of zero or more cables having effectiveness ratios that exceed the prescribed deviation amount; and program code for modifying the virtual model with prescribed graphical indicia to identify cable(s) that exceed the prescribed deviation amount.

20. The computer program product as defined by claim 19 further comprising program code for transforming the virtual model to re-route cable(s) that exceed the prescribed deviation amount.

21. The computer program product as defined by claim 19 wherein the program code for modifying comprises program code for displaying a first plurality of cables using a first format and displaying a second plurality of cables using a second format, the first and second formats being different, the first plurality of cables being within the prescribed deviation amount, the second plurality of cables exceeding the prescribed deviation amount.

22. The computer program product as defined by claim 19 further comprising:

program code for determining the mean effectiveness ratio for the plurality of cables; and program code for determining the standard deviation from the mean effectiveness ratio, the prescribed deviation amount being the standard deviation.

23. The computer program product as defined by claim 19 further comprising:

program code for producing a table of cables indicating the effectiveness ratio for each of the cables in the table;

program code for displaying identification information of cable(s) in the table with effectiveness ratio(s) exceeding the prescribed deviation amount, if any, using a first format; and program code for displaying identification information of cable(s) in the table with effectiveness ratio(s) not exceeding the prescribed deviation amount, if any, using a second format, the first format different from the second format.

\* \* \* \* \*